US006336355B1

(12) United States Patent
Sasaki et al.

(10) Patent No.: US 6,336,355 B1
(45) Date of Patent: Jan. 8, 2002

(54) COMBUSTION CONDITION DETECTING APPARATUS FOR AN INTERNAL COMBUSTION ENGINE

(75) Inventors: Shu Sasaki; Koichi Okamura; Yasuyoshi Hatazawa; Mitsuru Koiwa; Hisanori Nobe, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/496,277

(22) Filed: Feb. 1, 2000

(30) Foreign Application Priority Data

Aug. 30, 1999 (JP) .......................................... 11-243091

(51) Int. Cl.⁷ ............................................. G01M 15/00
(52) U.S. Cl. ..................................... 73/35.08; 73/118.1
(58) Field of Search ............................. 73/35.01, 35.03, 73/35.04, 35.06, 35.08, 35.07, 116, 117.2, 117.3, 118.1

(56) References Cited

U.S. PATENT DOCUMENTS

| | | | |
|---|---|---|---|
| 5,675,072 A | * | 10/1997 | Yasuda et al. ............. 73/35.08 |
| 5,747,670 A | * | 5/1998 | Takahashi et al. ......... 73/35.08 |
| 5,895,839 A | * | 4/1999 | Takahashi et al. ......... 73/35.08 |
| 6,054,859 A | * | 4/2000 | Takahashi et al. ......... 73/35.08 |
| 6,185,984 B1 | * | 2/2001 | Takahashi .................. 73/35.08 |
| 6,196,054 B1 | * | 3/2001 | Okamura et al. .......... 73/35.08 |
| 6,202,474 B1 | * | 3/2001 | Takahashi et al. ......... 73/35.08 |
| 6,205,844 B1 | * | 3/2001 | Morita et al. .............. 73/35.08 |

FOREIGN PATENT DOCUMENTS

| | | |
|---|---|---|
| DE | 196 47 161 A1 | 12/1997 |
| DE | 197 33 869 A1 | 9/1998 |
| JP | 5-149229 | 6/1993 ............ F02P/17/00 |

* cited by examiner

Primary Examiner—Eric S. McCall
(74) Attorney, Agent, or Firm—Sughrue Mion, PLLC

(57) ABSTRACT

To provide a combustion condition detecting apparatus for an internal combustion engine, which may well detect the combustion conditions such as discrimination of a combustion cylinder and knock generating condition and may reduce a circuit scale therefor, there are provided an ignition coil 21 provided for each cylinder; an ignition plug 20 for discharging by the application of the ignition high tension voltage to ignite mixture within the cylinder; a bias circuit 1 provided for each cylinder for applying a bias voltage to the ignition plug 20; an ionic current detection circuit 2 provided for each cylinder for detecting as an ionic current detection signal an ionic current 6 generated in the cylinder that is immediately after the combustion of the mixture; a knock signal processing circuit 4 provided one for a combination of a plurality of cylinders that are every two or more cylinders in ignition order on the basis of a sum of the ionic current detection signals; and an ECU 5 for detecting the combustion condition of the ignition plug on the basis of the knock signal.

4 Claims, 5 Drawing Sheets

COMBUSTION CONDITION DETECTING APPARATUS FOR AN INTERNAL COMBUSTION ENGINE

BACKGROUND OF THE INVENTION

1. Field of the Invention

The present invention relates to a combustion condition detecting apparatus for an internal combustion engine for detecting combustion a combustion condition, and more particularly to a combustion condition detecting apparatus for an internal combustion engine for detecting combustion conditions such as a knock generating condition or a cylinder discrimination on the basis of an ionic current generated in a cylinder that is immediately after the combustion.

2. Description of the Related Art

Conventionally, there has been proposed an apparatus, in which an ignition plug is used as an electrode for detecting an ionic current, for detecting combustion conditions, for example, for detecting an absence/presence of a knock or for discriminating a combustion cylinder on the basis of an amount of the ionic current detected immediately after the ignition.

The discrimination of the combustion cylinder, i.e., the cylinder discrimination means to identify which cylinder is under combustion in a simultaneous ignition mode immediately after the start of the engine. In a four-cycle internal combustion engine in which the motion of the ignition stroke and the motion of the exhaust stroke are the same, it is possible to detect which cylinder is under combustion stroke if a motion of a cam is physically detected by providing, for example, a sensor such as a cam sensor. However, in the case of, for example, a crank sensor only, without providing such a sensor, it is impossible to know which cylinder is under combustion.

In view of the foregoing fact, in the simultaneous ignition mode immediately after the start of the engine, fuel is injected simultaneously to, for example, two cylinders that are in synchronism with each other in the ignition stroke and the exhaust stroke and ignited. Since the ionic current is detected in the cylinder that is under combustion, the cylinder that is under combustion is identified on the basis of the ionic current.

In the simultaneous ignition mode, the fuel is simultaneously injected and the ignition is simultaneously effected by grouping a plurality of cylinders in which the ignition stroke and the exhaust stroke are performed at the same timing, for example, the first cylinder and the fourth cylinder, and the second cylinder and the third cylinder. Then, after the judgement of the cylinder that is under combustion stroke has been identified on the basis of the ionic current as described above, the operation is moved therefrom to a regular mode in which the fuel is injected in a sequential manner only into the cylinder under ignition stroke and the ignition is effected.

On the other hand, with respect to the detection of absence/presence of the knock, if the knock is generated in the internal combustion engine, a vibratory component of the knock is superimposed on the ionic current. For this reason, by extracting this vibratory component, it is possible to judge whether the knock is generated.

FIG. 3 is a block diagram showing a conventional combustion condition detecting apparatus for an internal combustion engine. In FIG. 3, reference numeral 21 denotes an ignition coil provided for each cylinder for generating an ignition high tension voltage and numeral 10 denotes a power transistor having an emitter thereof grounded. Numeral 20 denotes an ignition plug for discharging by the application of the ignition high tension voltage to ignite the mixture within the cylinder of the internal combustion engine. Numeral 30 denotes an ionic current detection circuit for charging the high tension voltage (bias voltage) for detecting an ionic current 6 by utilizing a secondary voltage of the ignition coil and for detecting as an ionic current detection signal the ion current generated when the discharge for ignition has been completed.

Also, numeral 3 denotes a combustion signal processing circuit composed of a comparator circuit and a timer circuit for producing a combustion signal by comparing with a predetermined detection level the ionic current detection signal outputted from the ionic current detection circuit 30. Numeral 4 denotes a knock signal processing circuit composed of a filter circuit and a waveform shaping circuit for picking up a knock signal, that will become a base for the knock detection, from the ionic current detection signal outputted from the ionic current detection circuit 30, for performing a waveform shaping to output a knock pulse. Numeral 5 denotes an ECU (electronic control unit) for inputting the combustion signal and a knock pulse to discriminate the combustion cylinder and to detect the absence/presence of the knock based upon various signal changes.

As shown in FIG. 3, the ionic current detection circuit 30, the combustion signal processing circuit 3, and the knock signal processing circuit 4 are provided for each cylinder.

In the thus constructed combustion condition detecting apparatus, the combustion conditions such as the discrimination of the combustion cylinder and the detection of absence/presence of the knock are detected on the basis of the ionic current extracted by the ionic current detection circuit 30.

Also, FIG. 4 is a block diagram showing another example of a conventional combustion condition detecting apparatus for an internal combustion engine. In the conventional example shown in FIG. 4, the ionic current detection circuit 30, the combustion signal processing circuit 3 and the knock signal processing circuit 4 are provided commonly for the four cylinders. FIG. 5 is a timing chart showing an output signal of each part of the circuit in FIG. 4. The numerals used in the leading part of the signal names in FIG. 5 correspond to contact points indicated by the same numerals in FIG. 4.

In the thus constructed combustion condition detecting apparatus, since the ionic current detection circuit 30, the combustion signal processing circuit 3 and the knock signal processing circuit 4 are provided commonly for the four cylinders, it is possible to reduce the scale of the circuit.

In the thus constructed conventional combustion condition detecting apparatus, in the conventional example shown in FIG. 3, since the ionic current detection circuit 30, the combustion signal processing circuit 3 and the knock signal processing circuit 4 are provided for each cylinder, there is a problem that the circuit scale is enlarged to increase a cost or a size.

On the other hand, in the conventional example shown in FIG. 4, it is possible to reduce the scale of the circuit. However, for example, in the case of the knock detection, as indicated by the ionic current detection signal indicated by the numeral 7 in FIG. 5, the sum of the ionic current detection signals of the respective cylinders is inputted into the knock signal processing circuit 4. Therefore, there is a fear that the knock detection would be incorrectly performed. In particular, at a high engine rpm, since noise upon the turn-on of the ignition signal of the cylinder that will be ignited next is superimposed on the knock signal of the previous cylinder, there is a problem that it is impossible to discriminate the knock signal from the noise to induce a misjudgment.

SUMMARY OF THE INVENTION

The present invention has been made in order to solve the above-noted defects, and therefore has an object to provide a combustion condition detecting apparatus for an internal combustion engine, which may well detect the combustion conditions such as discrimination of a combustion cylinder and detection of absence/presence of a knock and may reduce a circuit scale therefor.

In order to achieve the above object, according to one aspect of the present invention, there is provided a combustion condition detecting apparatus for an internal combustion engine, comprises an ignition coil provided for each cylinder for generating an ignition high tension voltage; an ignition plug for discharging by the application of the ignition high tension voltage to ignite mixture within the cylinder of the internal combustion engine; a bias circuit provided for each cylinder for applying a bias voltage to the ignition plug; an ionic current detection circuit provided for each cylinder for detecting as an ionic current detection signal an ionic current corresponding to an amount of ion generated in the cylinder that is immediately after the combustion of the mixture; a knock signal processing circuit provided one for a combination of a plurality of cylinders that are every two or more cylinders in ignition order to produce a knock signal for representing a knock generation condition of the internal combustion engine on the basis of the sum of the ionic current detection signals; and an ECU for detecting the combustion condition of the ignition plug on the basis of the knock signal and for calculating a control parameter.

According to another aspect of the present invention, there is provided the combustion condition detecting apparatus for an internal combustion engine, further comprising a combustion signal processing circuit provided one for a plurality of cylinders of a combination different from the combination of the cylinders that are under simultaneous ignition in a simultaneous ignition mode and for producing a combustion signal by comparing the sum of the ionic current detection signals with a predetermined detection level, wherein the ECU makes a cylinder discrimination and a combustion judgement on the basis of the combustion signal.

According to still another aspect of the present invention, there is provided the combustion condition detecting apparatus for an internal combustion engine, wherein the ionic current detection circuit is made up of a current mirror circuit for feeding to the combustion signal processing circuit an ionic current detection signal similar to the ionic current detection signal to be fed to the knock signal processing circuit.

According to a further aspect of the present invention, there is provided a combustion condition detecting apparatus for an internal combustion engine, comprises an ignition coil provided for each cylinder for generating an ignition high tension voltage; an ignition plug for discharging by the application of the ignition high tension voltage to ignite mixture within the cylinder of the internal combustion engine; a bias circuit provided for each cylinder for applying a bias voltage to the ignition plug; an ionic current detection circuit provided for each cylinder for detecting as an ionic current detection signal an ionic current corresponding to an amount of ion generated in the cylinder that is immediately after the combustion of the mixture; a combustion signal processing circuit provided one for a plurality of cylinders of a combination different from the combination of the cylinders that are under simultaneous ignition in a simultaneous ignition mode and for producing a combustion signal by comparing the sum of the ionic current detection signals with a predetermined detection level; and an ECU for making a cylinder discrimination and a combustion judgment on the basis of the combustion signal.

DESCRIPTION OF THE PREFERRED EMBODIMENTS

Embodiment 1

Figure 1:
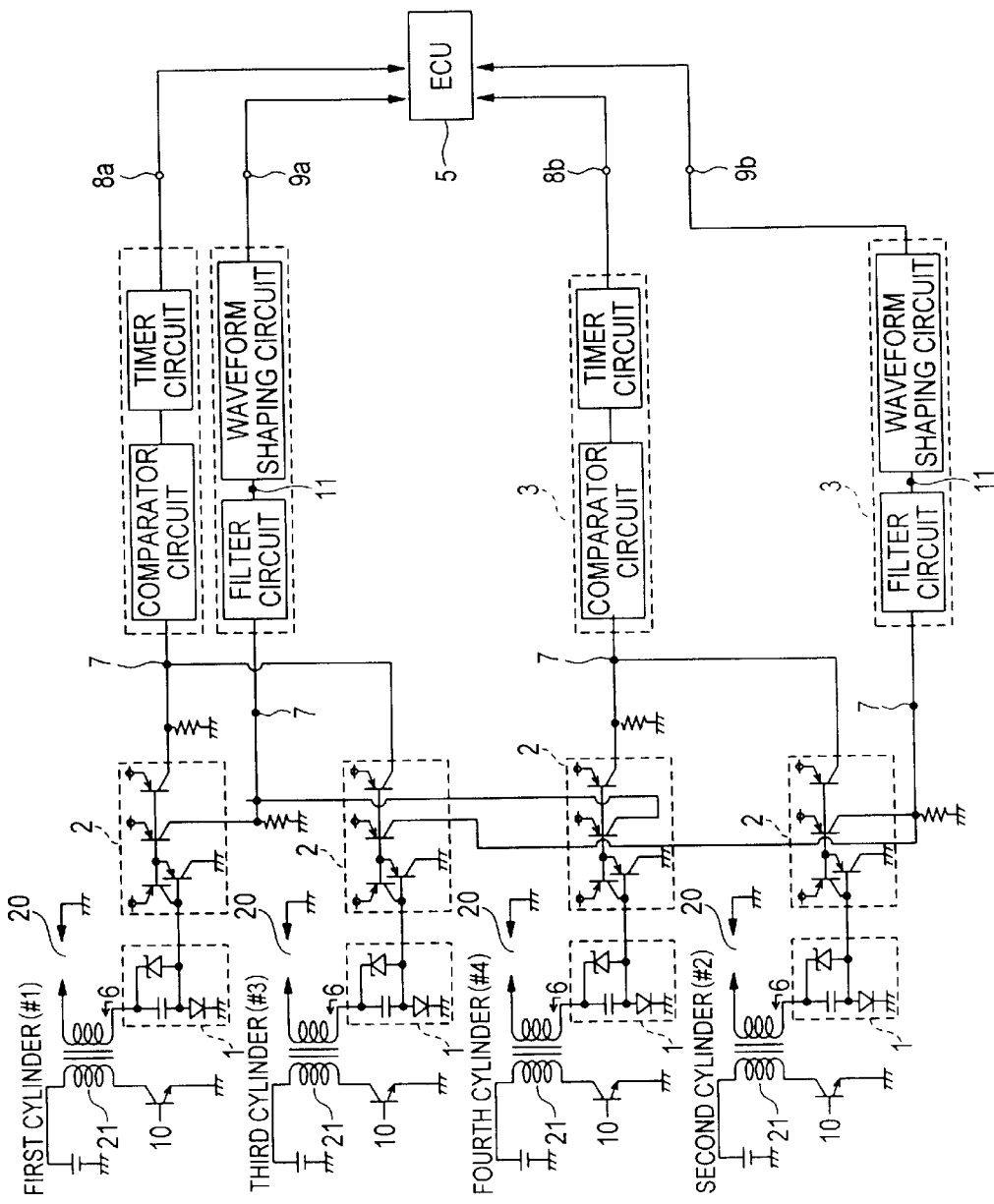
FIG. 1 is a block diagram showing a combustion condition detecting apparatus for an internal combustion engine according to the present invention.

FIG. 1 is a block diagram showing a combustion condition detecting apparatus for an internal combustion engine according to the present invention. In FIG. 1, reference numeral 21 denotes an ignition coil provided for each cylinder for generating an ignition high tension voltage. Numeral 20 denotes an ignition plug for discharging by the application of the ignition high tension voltage to ignite the mixture within the cylinder of the internal combustion engine. Numeral 1 denotes a bias circuit for charging the high tension voltage (bias voltage) for detecting an ionic current 6 by utilizing a secondary voltage of the ignition coil and for applying the charged high voltage to the ignition plug. Numeral 2 denotes an ionic current detection circuit for detecting an ionic current 6 which is generated when the discharge for the ignition has been completed and for outputting an ionic current detection signal on the basis of an ionic current 6 which corresponds to an ionic amount generated in the cylinder. The ionic current detection circuit 2 is made up of a current mirror circuit.

Also, numeral 3 denotes a combustion signal processing circuit composed of a comparator circuit and a timer circuit for producing a combustion signal by comparing with a predetermined detection level the ionic current detection signal outputted from the ionic current detection circuit 2. Numeral 4 denotes a knock signal processing circuit composed of a filter circuit and a waveform shaping circuit for picking up a knock signal, that will become a base for the knock detection, from the ionic current detection signal outputted from the ionic current detection circuit 2, for performing a waveform shaping to output a knock pulse. Numeral 5 denotes an ECU (electronic control unit) for inputting the combustion signal and a knock pulse to discriminate the combustion cylinder and to detect the absence/presence of the knock based upon various signal changes.

As shown in FIG. 1, the bias circuit 1 and the ionic current detection circuit 2 are provided independently for each cylinder. Then, the ionic current detection circuit 2 is made up of a current mirror circuit as described above and outputs a similar current (ionic current detection signal) to the two destinations, i.e., the combustion signal processing circuit 3 and the knock signal processing circuit 4.

The internal combustion engine according to this embodiment is a four-cycle internal combustion engine in which the first cylinder, the third cylinder, the fourth cylinder and the second cylinder are ignited in this order. As shown in FIG. 1, the single combustion signal processing circuit 3 is provided for every two cylinders. The combustion signal processing circuits 3 are provided one for a combination of cylinders different from the cylinders that are under simultaneous ignition immediately after the start of the engine, i.e., the combination of the first cylinder and the third cylinder, and the combination of the second cylinder and the fourth cylinder. The sum of the ionic current detection signals of the respective cylinders are inputted into the combustion signal processing circuit 3.

Also, the single knock signal processing circuit 4 is provided for every two cylinders. The knock signal processing circuits 4 are provided one for the combinations of every two cylinders in the ignition order, i.e., the combination of the first cylinder and the fourth cylinder and the combination of the second cylinder and the third cylinder. The sum of the ionic current detection signals of the respective cylinders is inputted into the knock signal processing circuit 4.

Figure 2:
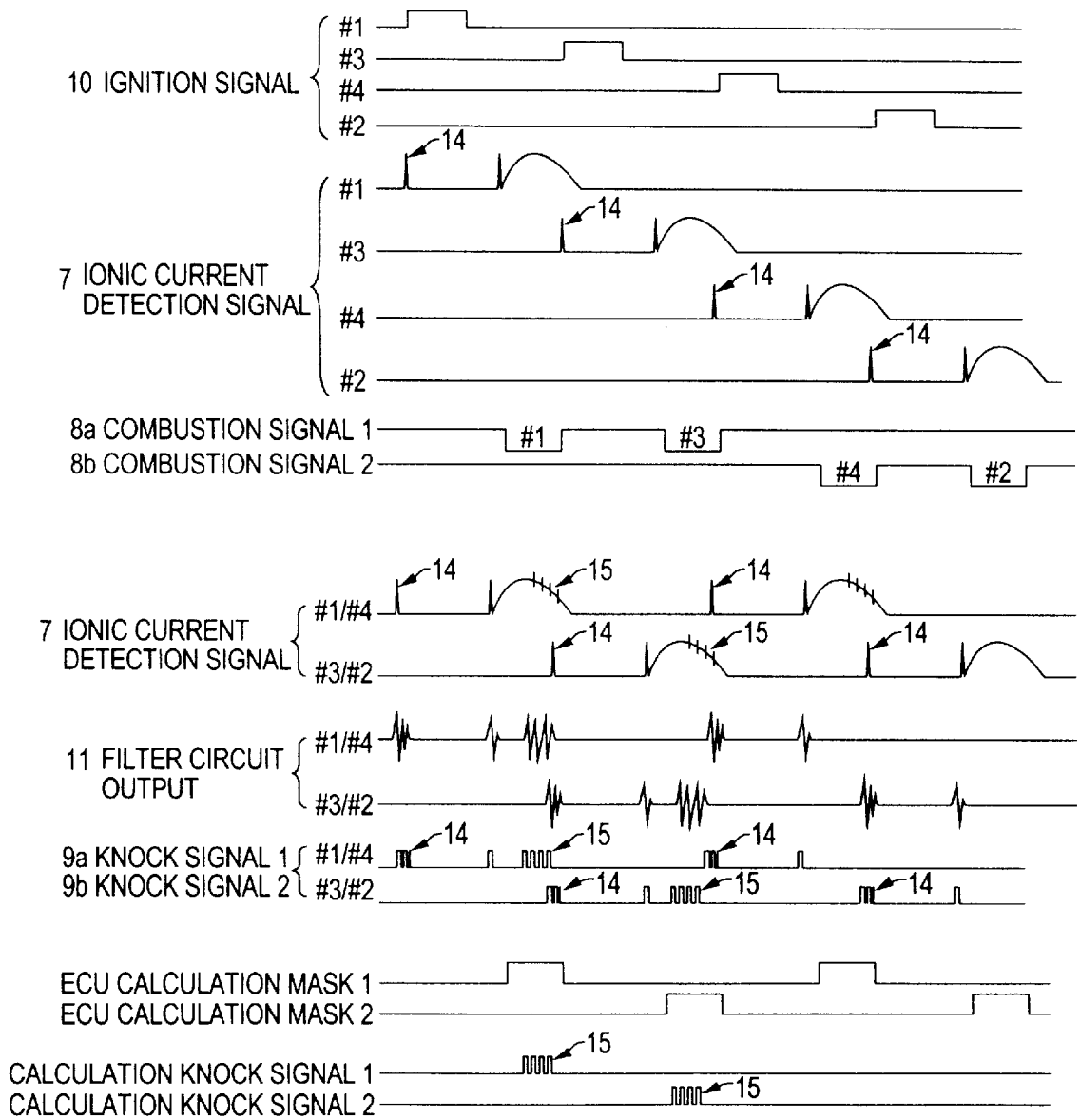
FIG. 2 is a timing chart showing an output signal of each part of the circuit shown in FIG. 1.
Figure 3:
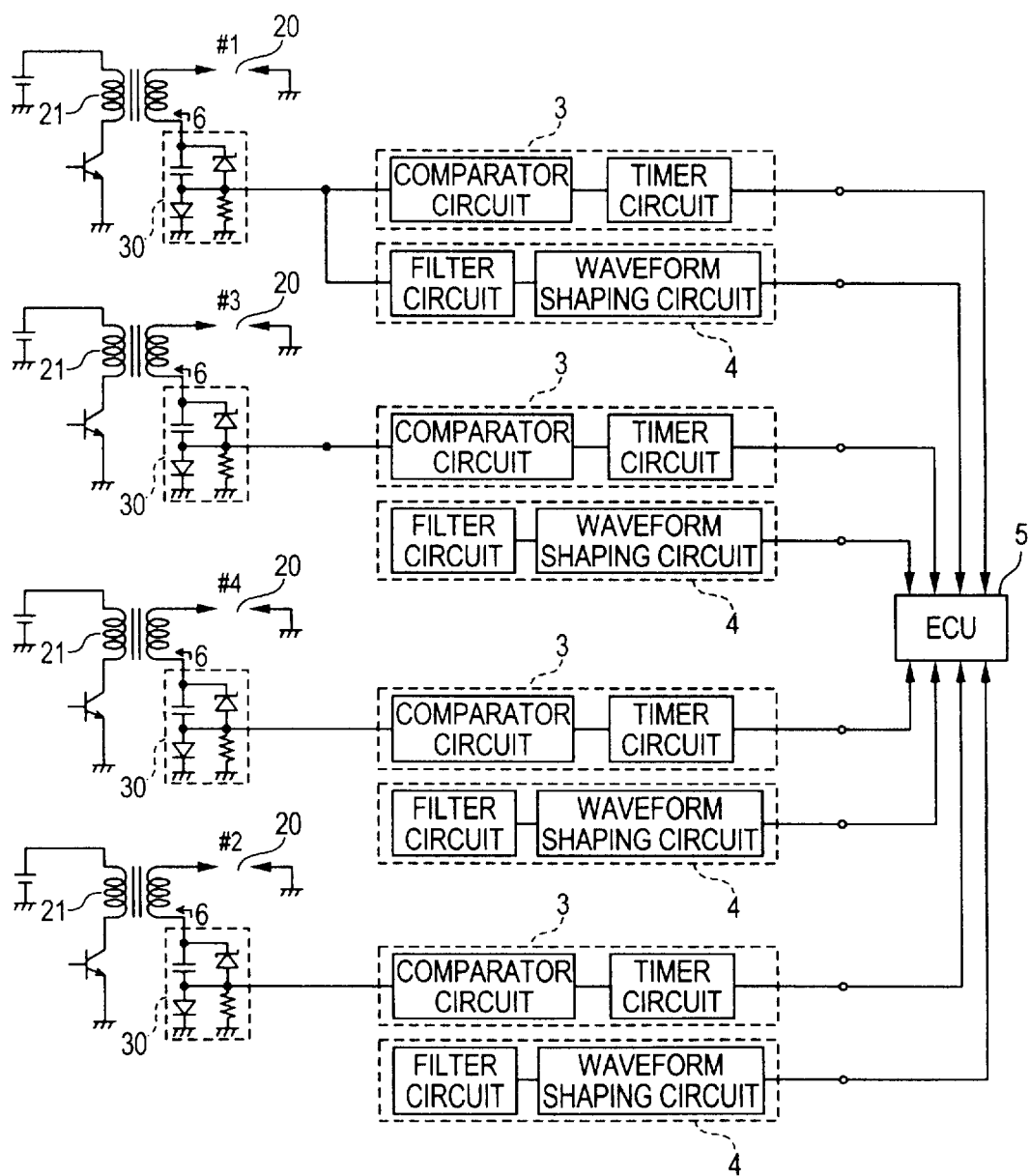
FIG. 3 is a block diagram showing a conventional combustion condition detecting apparatus for an internal combustion engine.
Figure 4:
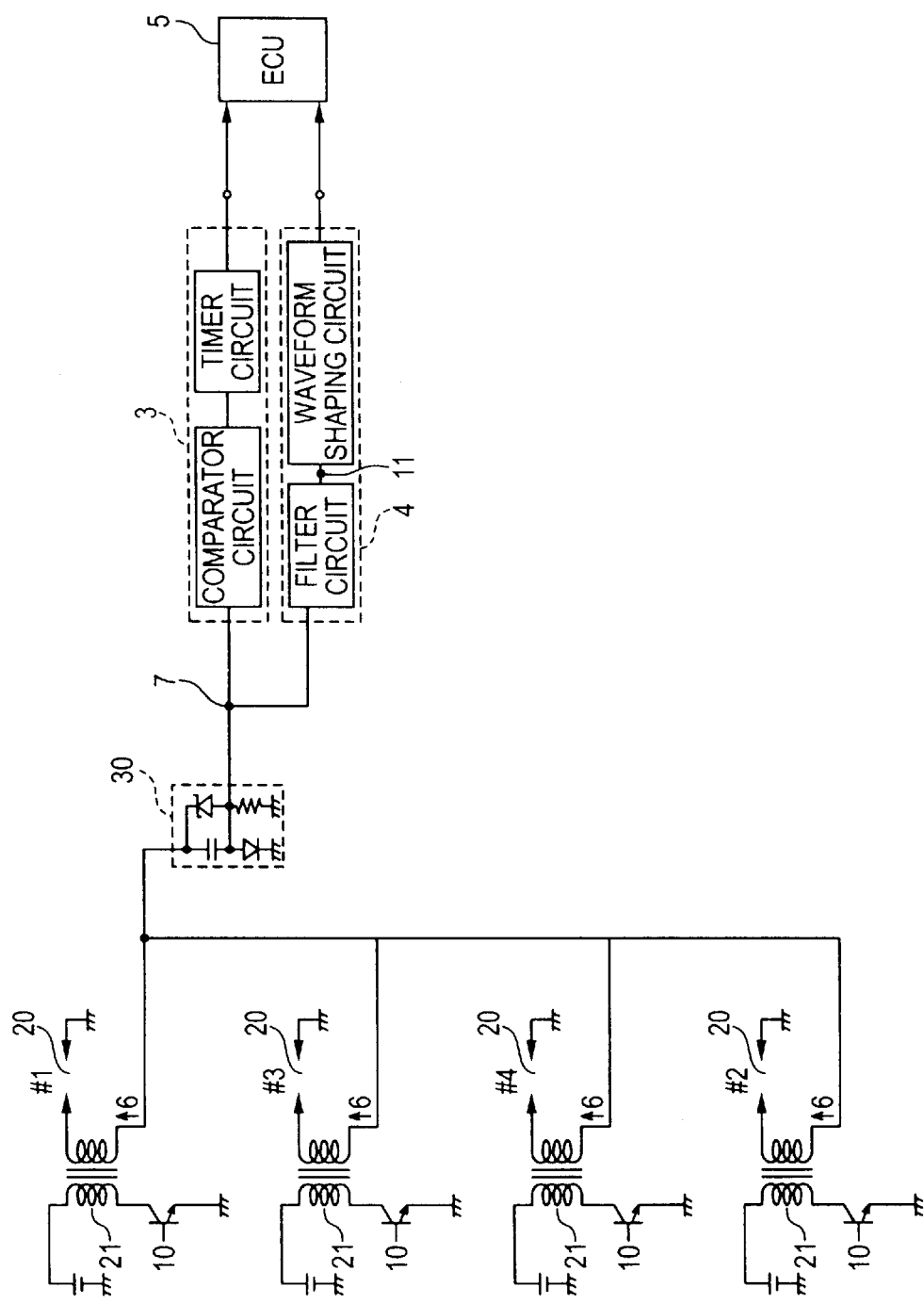
FIG. 4 is a block diagram showing another example of a conventional combustion condition detecting apparatus for an internal combustion engine.
Figure 5:
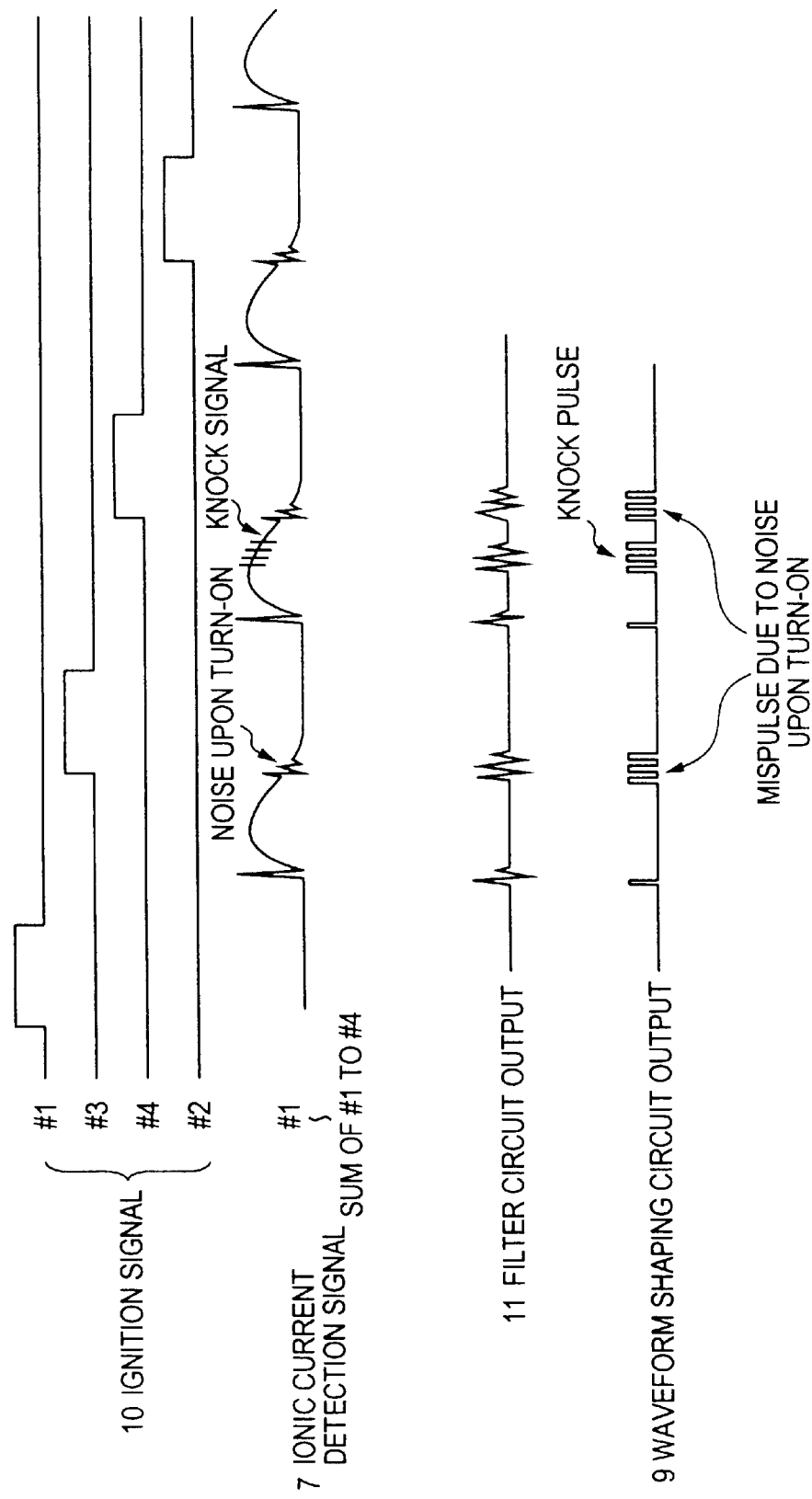
FIG. 5 is a timing chart showing an output signal of each part of the circuit shown in FIG. 4.

FIG. 2 is a timing chart showing an output signal of each part of the circuit shown in FIG. 1. The numerals used in the leading part of the signal names in FIG. 2 correspond to contact points indicated by the same numerals in FIG. 1, wherein numerals 8a and 8b correspond to the outputs of the combustion signal processing circuits 3, numerals 9a and 9b correspond to the outputs of the knock signal processing circuits 4, numeral 11 corresponds to the output of the filter circuit of the knock signal processing circuits 4.

In the thus constructed combustion condition detecting apparatus for an internal combustion engine, since the ionic current detection circuit 2 made up of the current mirror circuit is provided for each cylinder, the signal processing may be performed with any desired combination of the cylinders. Then, the change of the combinations is also easy.

The sum of the ionic current detection signal for the combinations of every two cylinders in the ignition order is taken to produce the knock pulses (knock signal 1 and knock signal 2 in FIG. 2) in the knock signal processing circuit 4 corresponding to knock 15, there is no fear that even at a high engine rpm, the noise 14 upon the turn-on of the ignition signal would be superimposed on the knock pulse of the cylinder that has been ignited before. The noise 14 upon the turn-on of the ignition signal may be removed by a calculation mask of ECU 5.

Furthermore, since the sum of the ionic current detection signals for the combination of cylinders different from the cylinders that are under simultaneous ignition in the simultaneous ignition mode is taken to be processed in the combustion signal processing circuit 3, it is possible to make the cylinder judgement from the ionic current detection signals.

Then, since the combustion signal processing circuits 3 and the knock signal processing circuits 4 are provided one for the two cylinders, it is possible to reduce the scale of the circuit.

Incidentally, although internal combustion engine according to this embodiment is a four-cycle internal combustion engine in which the first cylinder, the third cylinder, the fourth cylinder and the second cylinder are ignited in this order, it goes without saying that the concept of the invention may be applied to the case where the number of the cylinders exceeds four. Namely, also in case of, for example, six cylinders, eight cylinders and twelve cylinders exceeding the four cylinders, the combustion signal processing circuits 3 are provided for the combinations different from the combinations of the cylinders that are under simultaneous ignition in the simultaneous ignition mode, and the sum of the ionic current detection signals of the respective cylinders may be inputted thereinto. One may be provided for the combination of the two or more cylinders.

Also, in the same manner, the knock signal processing circuits 4 are provided for the combination of every two or more cylinders in the ignition order and the sum of the ionic current detection signals of the respective cylinders may be inputted thereinto. One may be provided for the combination of two or more cylinders.

In order to achieve the above object, according to one aspect of the present invention, there is provided a combustion condition detecting apparatus for an internal combustion engine, comprises an ignition coil provided for each cylinder for generating an ignition high tension voltage; an ignition plug for discharging by the application of the ignition high tension voltage to ignite mixture within the cylinder of the internal combustion engine; a bias circuit provided for each cylinder for applying a bias voltage to the ignition plug; an ionic current detection circuit provided for each cylinder for detecting as an ionic current detection signal an ionic current corresponding to an amount of ion generated in the cylinder that is immediately after the combustion of the mixture; a knock signal processing circuit provided one for a combination of a plurality of cylinders that are every two or more cylinders in ignition order to produce a knock signal for representing a knock generation condition of the internal combustion engine on the basis of the sum of the ionic current detection signals; and an ECU for detecting the combustion condition of the ignition plug on the basis of the knock signal and for calculating a control parameter. For this reason, it is possible to detect the knock detection condition well and to reduce the scale of the circuit.

According to another aspect of the present invention, there is provided the combustion condition detecting apparatus for an internal combustion engine, further comprising a combustion signal processing circuit provided one for a plurality of cylinders of a combination different from the combination of the cylinders that are under simultaneous ignition in a simultaneous ignition mode and for producing a combustion signal by comparing the sum of the ionic current detection signals with a predetermined detection level, wherein the ECU makes a cylinder discrimination and a combustion judgement on the basis of the combustion signal. For this reason, For this reason, it is possible to detect the knock detection condition well, to make a good judgement of combustion and discrimination of the cylinder and to reduce the scale of the circuit.

According to still another aspect of the present invention, there is provided the combustion condition detecting apparatus for an internal combustion engine, wherein the ionic current detection circuit is made up of a current mirror circuit for feeding to the combustion signal processing circuit an ionic current detection signal similar to the ionic current detection signal to be fed to the knock signal processing circuit. For this reason, it is easy to constitute the circuit in any desired combination of the cylinders. Also, the change of the combinations is easy.

According to a further aspect of the present invention, there is provided a combustion condition detecting apparatus for an internal combustion engine, comprises an ignition coil provided for each cylinder for generating an ignition high tension voltage; an ignition plug for discharging by the application of the ignition high tension voltage to ignite mixture within the cylinder of the internal combustion engine; a bias circuit provided for each cylinder for applying a bias voltage to the ignition plug; an ionic current detection circuit provided for each cylinder for detecting as an ionic current detection signal an ionic current corresponding to an amount of ion generated in the cylinder that is immediately after the combustion of the mixture; a combustion signal processing circuit provided one for a plurality of cylinders of a combination different from the combination of the cylinders that are under simultaneous ignition in a simultaneous ignition mode and for producing a combustion signal by comparing the sum of the ionic current detection signals with a predetermined detection level; and an ECU for making a cylinder discrimination and a combustion judgment on the basis of the combustion signal. For this reason, it is possible to make a good judgement of combustion and discrimination of the cylinder and to reduce the scale of the circuit.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A combustion condition detecting apparatus for an internal combustion engine including a plurality of cylinders, comprising:

a plurality of ignition coils for generating an ignition high tension voltage, each of the ignition coils being provided for a corresponding one of the cylinders;

a plurality of ignition plugs connected to said ignition coils, each of the ignition plugs discharging in response to said ignition high tension voltage to ignite a mixture of fuel and air within a corresponding one of the cylinders of the internal combustion engine;

a plurality of bias circuits for applying a bias voltage to said ignition plugs;

a plurality of ionic current detection circuits connected to the bias circuits, each of the ion current detection circuits detecting an ionic current corresponding to an amount of ion generated in a corresponding cylinder immediately after the combustion of the mixture and generating an ionic current detection signal based on the detected ion current;

a plurality of knock signal processing circuits for generating knock signal for representing a knock generation condition of said internal combustion engine on the basis of a sum of said ionic current detection signals, each of said knock signal processing circuits being coupled to at least two of said ionic current detection circuits so that each of said knock signal processing circuits is provided for one cylinder in each of a plurality of groups of two or more of the cylinders in ignition order; and an electronic control unit (ECU) coupled to said knock signal processing circuits for detecting the combustion condition of said ignition plug on the basis of said knock signals.

2. The combustion condition detecting apparatus for an internal combustion engine according to claim 1, further comprising a plurality of combustion signal processing circuits for generating combustion signals by comparing a sum of said ionic current detection signals with a predetermined detection level, each of said combustion signal processing circuits being coupled to at least two of said ionic current detection circuits provided for at least two of said cylinders which are not simultaneously ignited in a simultaneous ignition mode occurring immediately after a start of the internal combustion engine, wherein said ECU receives said combustion signals from said combustion signal processing circuits, makes a cylinder discrimination and a combustion judgement on the basis of said combustion signal.

3. The combustion condition detecting apparatus for an internal combustion engine according to claim 2, wherein each of said ionic current detection circuits comprises a current mirror circuit.

4. A combustion condition detecting apparatus for an internal combustion engine including a plurality of cylinders, comprising:

a plurality of ignition coils for generating an ignition high tension voltage, each of the ignition coils being provided for a corresponding one of the cylinders;

a plurality of ignition plugs connected to said ignition coils, each of the ignition plugs discharging in response to said ignition high tension voltage to ignite a mixture of fuel and air within a corresponding one of the cylinders of the internal combustion engine;

a plurality of bias circuits for applying a bias voltage to said ignition plugs;

a plurality of ionic current detection circuits connected to the bias circuits, each of the ion current detection circuits detecting an ionic current corresponding to an amount of ion generated in a corresponding cylinder immediately after the combustion of the mixture and generating an ionic current detection signal based on the detected ion current;

a plurality of combustion signal processing circuits for generating combustion signals by comparing a sum of said ionic current detection signals with a predetermined detection level, each of said combustion signal processing circuits being coupled to at least two of said ionic current detection circuits provided for at least two of said cylinders which are not simultaneously ignited in a simultaneous ignition mode occurring immediately after a start of the internal combustion engine; and an electronic control unit (ECU) connected to said combustion signal processing circuits for receiving said combustion signals, making a cylinder discrimination and a combustion judgment on the basis of said combustion signal.

* * * * *